INVENTOR.
B. BILDAT

Dec. 8, 1970  B. BILDAT  3,545,307
MEANS FOR THE SYNCHRONIZED SHIFTING OF
TRANSMISSIONS IN MOTOR VEHICLES
Filed April 11, 1968  4 Sheets-Sheet 4

United States Patent Office 3,545,307
Patented Dec. 8, 1970

3,545,307
MEANS FOR THE SYNCHRONIZED SHIFTING OF TRANSMISSIONS IN MOTOR VEHICLES
Benno Bildat, Erlangen, Germany, assignor to Robert Bosch GmbH, Stuttgart, Germany, a limited corporation of Germany
Filed Apr. 11, 1968, Ser. No. 720,578
Claims priority, application Germany, Apr. 27, 1967, Sch 40,622
Int. Cl. F16h *3/38;* B60k *21/04*
U.S. Cl. 74—858                                            6 Claims

ABSTRACT OF THE DISCLOSURE

A device for automatically shifting gears by a reversing mechanism coupled with a comparison device, over which a circuit starting the deceleration of the engine is energized at a too high engine speed, related to the synchronism of the gear members to be coupled, and a circuit starting the acceleration of the engine is energized at a too low engine speed. A blocking circuit is connected with the reversing mechanism so as to block the transmission of a signal indicating the synchronisms on the gear shift motor or to prevent the formation of this signal when changing from the acceleration of the engine to the deceleration of the engine, but which permits the direct transmission of the above-mentioned signal and the formation of this signal when changing from the deceleration of the engine to the acceleration of the engine. The switching arrangement has the effect that the engagement of a preselected gear is never effected, at least for an adjustable time period, during operating states with increasing engine speed.

---

This invention concerns means for the synchronized shifting of transmissions in motor vehicles by means of which the engagement of a certain gear is effected by a gear shift motor when a certain shifting condition is achieved in a measuring and comparison circuit which indicates the synchronous running of the respective gear members to be coupled.

A device for the synchronous shifting of transmissions in motor vehicles is already known from Swiss Pat. No. 381,635 where the electric measuring quantities representing the driving and driven gear shaft speeds produced by generators coupled with the driving shaft of the transmission and with the driven shaft of the transmission are fed, with the interposition of shiftable preselected gears, to corresponding electric switching elements of a comparison device which emits an electric signal releasing a gear shift motor at the appearance of a predetermined ratio indicating the synchronism of the gear members to be coupled.

Apart from the disadvantage that in this known device the signal exciting the gear shift motor is generally so short, due to the short duration of the operating state corresponding to the synchronism, that the start of the gear shift motor on the basis of its inherent response time is not always positively achieved, there is the additional difficulty in the above-mentioned patented device that the entire arrangement, and particularly the mechanical devices, is subject to such inertia that the engagement of the preselected gear cannot be effected exactly at the time of the synchronism of the gear members to be coupled.

While this is not particularly noticeable in cases where the synchronism of the gear members to be coupled lasts a relatively long time, unpleasant and trouble-causing phenomena appear particularly when the rate of acceleration of the engine speed is particularly high at the time of the synchronism of the gear members to be coupled, since extremely high load impacts appear then with a delay in the engagement time which are caused by the engine masses accelerated in the time between the synchronous operating state and the engagement of the selected gear.

The above-mentioned difficulties are observed particularly in heavy motor vehicles when shifting from higher to lower gears mainly in the lower speed range, since the gas supply, effected either automatically or by the driver, is then very difficult to control properly and leads generally to excessive acceleration of the engine.

The object of the present invention is to reduce and eliminate the above-mentioned load impacts.

This problem is solved according to the invention in a device for automatically shifting gears by a reversing mechanism coupled with the comparison device, over which a circuit starting the deceleration of the engine is energized at a too high engine speed, related to the synchronism of the gear members to be coupled, and a circuit starting the acceleration of the engine is energized at a too low engine speed, and controlled by a blocking circuit. This blocking circuit is connected with the reversing mechanism so as to block the transmission of the signal indicating the synchronisms on the gear shift motor or to prevent the formation of this signal when changing from the switching state of the reversing mechanism starting the acceleration of the engine to the switching state starting the deceleration of the engine, but which permits the direct transmission of the above-mentioned signal and the formation of this signal when changing from the switching state of the reversing mechanism starting the deceleration of the engine to the switching state starting the acceleration of the engine.

The switching arrangement according to the invention has the effect that the engagement of a preselected gear is never effected, at least for an adjustable time period, during operating states with increasing engine speed, since the reducing speed is always much lower than the increasing speed and consequently the load impacts caused by a delayed engagement are considerably reduced.

This switching arrangement permits the engagement of a preselected gear without the drivng motor of the respective vehicle being uncoupled from the change-speed gear, for example, by operating the clutch. In this type of engagement of the preselected gear, it is particularly important that the rate of acceleration of the relative speeds of the respective gear members to be coupled be kept low, otherwise load impacts would be extremely hard on the basis of the motor-masses and moments of inertia to be taken into consideration.

At this point it should be noted that the electrical switching means in the form of electromechanical relays mentioned in the course of the present specification can naturally be replaced in a manner familitar to one skilled in the art by electronic parts, for example, by switching transistors, flip-flop circuits, etc.

The invention will be explained more fully by the description of a few preferred embodiments, with reference to the accompanying drawings, in which.

Figure 3:
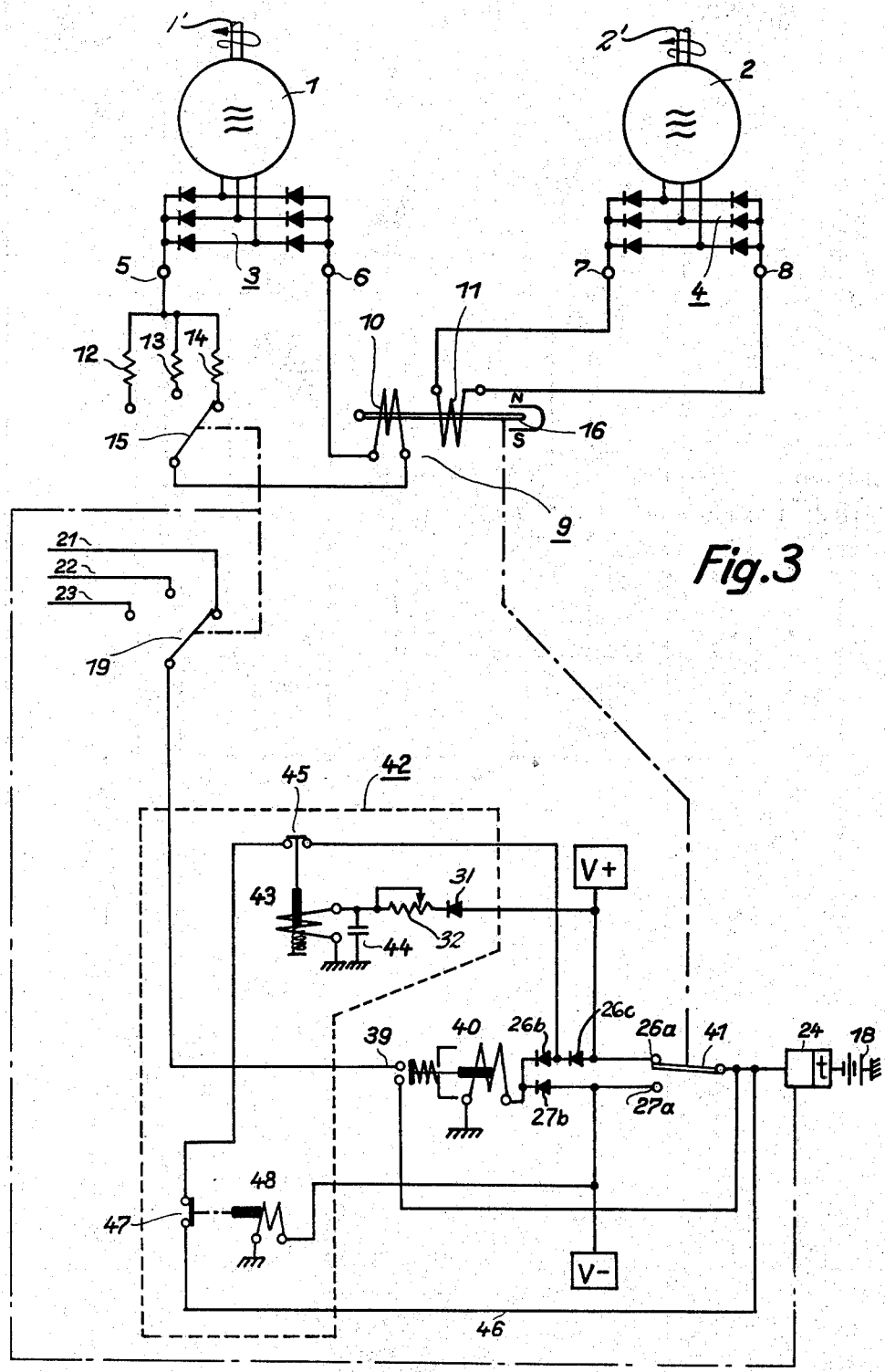
Figure 4:
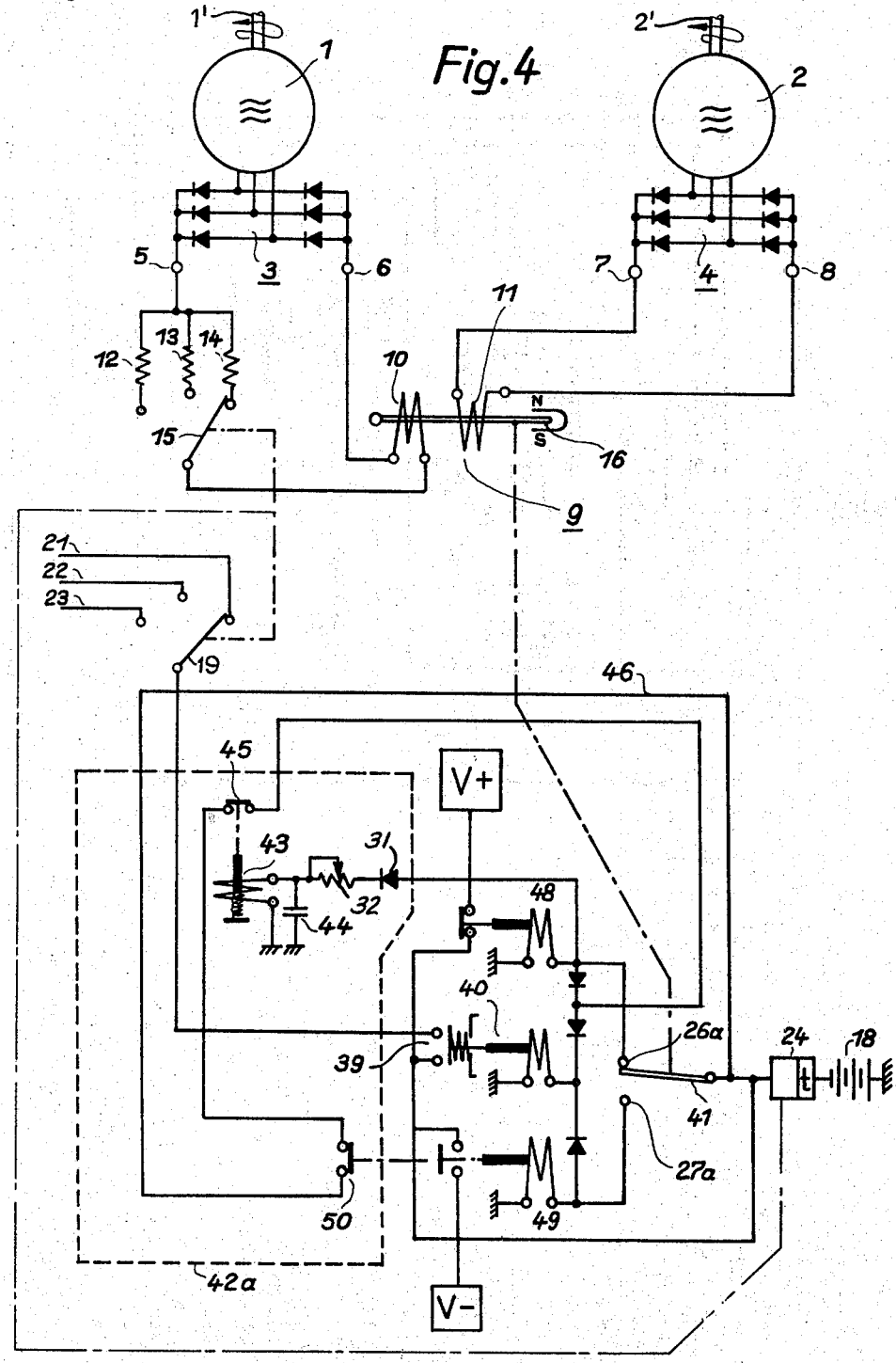

FIG. 3 shows another embodiment of the device according to the invention for the synchronized shifting of transmissions in motor vehicles where the comparison device has a relay with rest contact and a switch actuated by a differential relay armature and controlling its excitation; and FIG. 4 shows a modified switching arrangement according to the invention as a variation of the embodiment in FIG. 3.

Corresponding parts of the embodiment according to the invention are provided with identical reference numbers in the drawings.

The drawings show two three-phase A-C generators 1 and 2 which can have, for example, the form of synchros, and which are rigidly coupled with the driving and driven shafts 1' and 2', respectively, of a transmission gear 91 such as that of United States Pat. 3,417,640. The output terminals of the above-mentioned A-C generators are connected to full wave rectifier circuits 3 and 4, which provide at their output terminals 5, 6 and 7, 8, respectively, D-C voltages proportional to the respective generator speeds and thus to the respective gear shaft speeds also as shown in U.S. Pat. 3,417,640.

Furthermore, a polarized relay arrangement 9 is provided which has two control windings 10 and 11. Control winding 11 is connected directly across the terminals 7 and 8 of the rectifier circuit 4, while control winding 10 can be connected selectively over one of the resistances 12, 13, or 14 by corresponding operation of a selector switch 15 to the rectifier circuit 3. The size of the resistances 12, 13, and 14 is so selected and graded that an equal excitation of the relay armature 16 is effected by control windings 10 and 11 when the synchronism of the preselected gear members to be coupled is established by connecting a certain resistances of the resistance-group 12, 13, or 14. This polarized relay excitation control also is disclosed in U.S. Pat. 3,417,640.

The polarized relay arrangement 9 contains a contractor 17 and contact 17' which are closed when the above-described state of equal excitation of the relay armature 16 results. The contractor 17 is connected to a current source 18 and the contact 17' with a line 20 leading to a distributor switch 19. As indicated in the drawings by a dot-dash line, the selector switch 15 and the distributor switch 19 are positively coupled with each other so that they can only move in corresponding circuits. The distributor switch 19 serves to transmit a signal offered during the synchronism of the gear members to be coupled on line 20 over one of the lines 21, 22, or 23 to a corresponding input of a gear shift motor 19' effecting the engagement of the gear members to be coupled in a manner as shown in the previously mentioned U. S. patent. Between the current source 18 and the contactor 17 is also connected a relay 24 with an adjustable delayed releasing time, which has the effect that the switching part of the devices according to the invention serving to start the gear shift motor is only alive during the duration of a gear shifting operation. This relay 24 is also positively coupled with the selector switch 15, as indicated in the drawings by a dot-dash line.

The switching arrangement according to the invention has a reversing switch which is formed in the present embodiment by an additional switch having a contactor 25 on the polarized differential relay 9. The contactor 25 of the reversing switch is connected through the above-mentioned relay 24 to the current source 18 and may be closed alternatively on a pair of contacts 26 and 27 respectively connected to a circuit V+ starting the acceleration and to a circuit V— starting the deceleration of the engine. These circuits can either serve to start the indicating devices which cause the driver of the vehicle to give gas intermediately and to operate a motor brake respectively or the above-mentioned circuits can excite servo drives which in turn act on the fuel supply regulation of the engine and on the actuating mechanism of an engine brake in the sense of an acceleration or deceleration, respectively, in corresponding parts and mechanisms as shown in connection with the engine and gear shift of applicant's previously mentioned U.S. patent.

Figure 1:
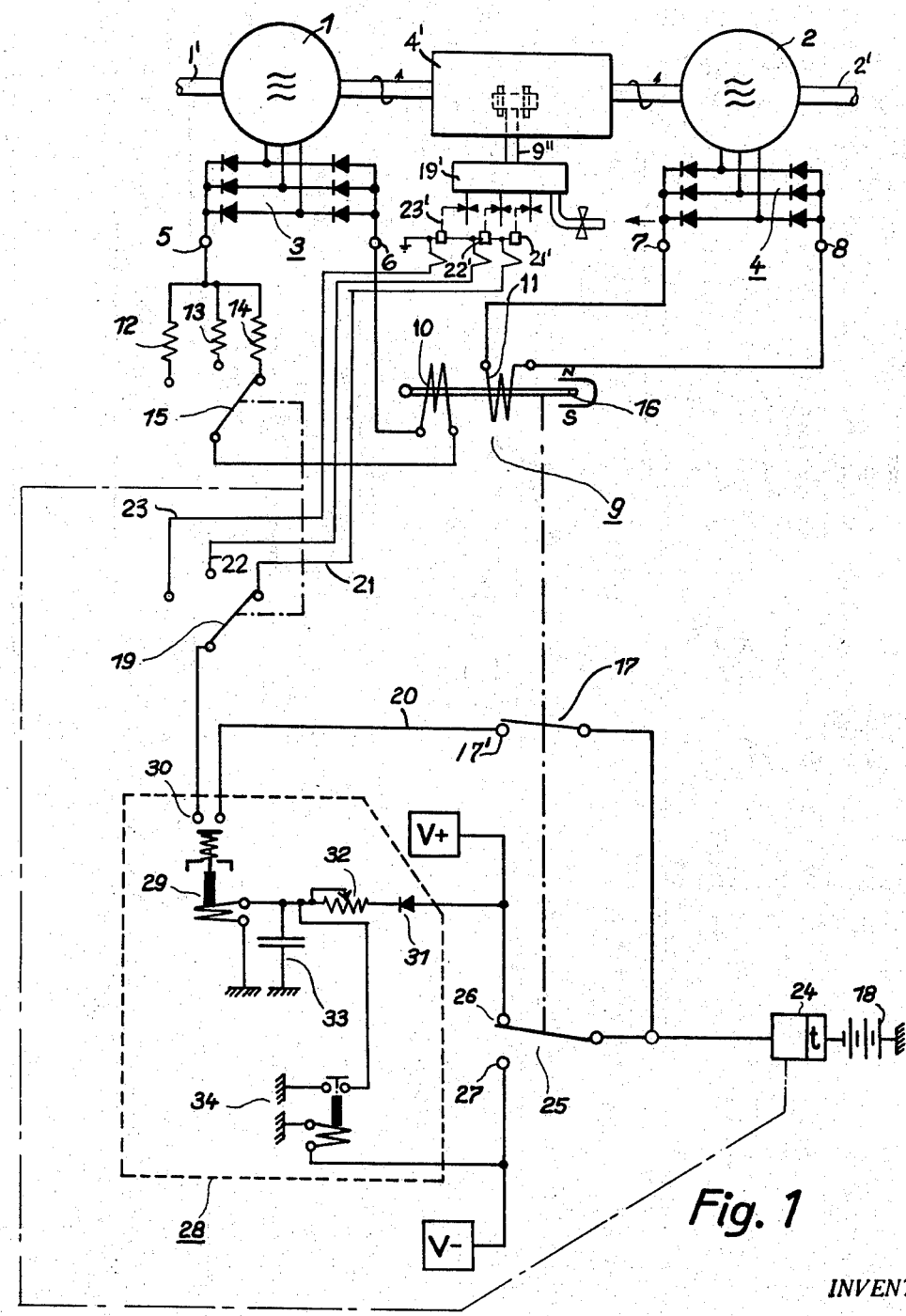
FIG. 1 shows a device according to the invention for the synchronized shifting of transmissions in motor vehicles where the comparison device is formed by a differential relay with central contact.

According to the invention a blocking circuit is also provided which is designated generally 28 in FIG. 1 of the drawings and which comprises the switching parts indicated inside the broken line.

The blocking circuit 28 contains a relay 29 whose contacts 30 are closed in the unexcited state of the relay and are connected in the line 20 between the contact 17' and the distributor switch 19. The relay 29 is energized from the circuit V+ starting the engine acceleration through a diode 31 and a variable resistance 32. As indicated in FIG. 1, the relay 29 has a holding circuit comprising a capacitor 33 connected across relay 29 which maintains the excitation of the relay during an adjustable short period even if there is no voltage in the circuit V+ associated with the engine acceleration.

The above-mentioned holding circuit can be rendered ineffective by short-circuiting the condenser 33 by means of a relay 34, which effects this disconnection due to the connection of its exciting winding to the circuit starting the engine deceleration when the relay armature 16 of the polarized relay 19 has switched the contactor 25 so as to connect the current source 18 to the contact 27. The method of operation of the circuit represented in FIG. 1 is as follows:

It is assumed that the driver has prepared a shifting operation from a higher to a lower gear by corresponding adjustment of the selector switch 15. The previously active gear is disengaged by a suitable device and at the same time relay 24 is energized for a certain period so that the voltage of the energy source 18 is applied to the contactors 17 and 25 of the polarized relay 16. Since the engine speed is generally too low, after disengagement of the previously active gear, in order to achieve the synchronism of the gear members to be coupled, the relay armature 16 moves the contactor 25, on the basis of the greater excitation of one of the two control windings 10 or 11 into a position in which the contact 26 is connected to the energy source 18, so that the circuit causing the acceleration of the engine is excited. At the same time relay 29 is also excited, so that the electric connection between the contacts 30 is interrupted. The acceleration of the engine is continued by the circuit V+ until the synchronism of the gear members to be coupled and thus the same excitation of the control windings 10 and 11 is achieved and the contactor 25 is switched from contact 26 to contact 27. The contactor 17 is briefly closed on contact 17', so that the voltage of the energy source 18 is applied to line 20 during the passage from the excitation of the circuit V+ to the excitation of the circuit V—, that is, during the briefly established synchronism of the gear members to be coupled.

However, since the exciting winding of relay 29 is still excited by the holding circuit 33 even after the disconnection of the circuit V+, and the contacts 30 consequently remain separated, this voltage does not energize the select or switch 19 and one of the signal lines 21, 22, or 23 at the corresponding input of the gear shift motor.

Due to the inertia inherent in the regulating mechanism of the car engine, the engine has in the meantime rapidly exceeded the operating state corresponding to the synchronism, which leads on the basis of a corresponding movement of the relay armature 16 to an excitation of the circuit V—, which in turn causes the deceleration of the engine. When the contactor 25 is closed on contact 27 of the reversing mechanism, the holding circuit 33 of relay 29 is short-circuited by relay 34, so that the contacts 30 of this relay are closed. But still no voltage energizes the distributor switch 19 and the signal lines 21, 22 or 23, since the contactor 17 is now again in open position and the current source 18 is consequently disconnected from line 20.

Only when the engine speed has been reduced so far by the circuit V— that there is again synchronism between the gear members to be coupled is the contactor 17 again closed on contact 17' and the voltage of the current source 18 is then connected to the respective selected line of the three signal lines 21, 22, or 23 to control the respective electromagnetic valves 21', 22', and 23' to provide the desired gear shift actuation by operating lever 9".

It should be noted that in the switching arrangement according to the invention the electric signal causing the engagement of the selected gear can also provide direct energization following the excitation of the circuit V+ starting the acceleration of the engine, namely, when the synchronism of the gear members to be coupled continues so long as the holding circuit 33 of relay 29 can discharge and the contacts 30 of the relay are closed. But in such a case the rate of increase of the engine speed is always so low that load impacts cannot appear at all.

Figure 2:
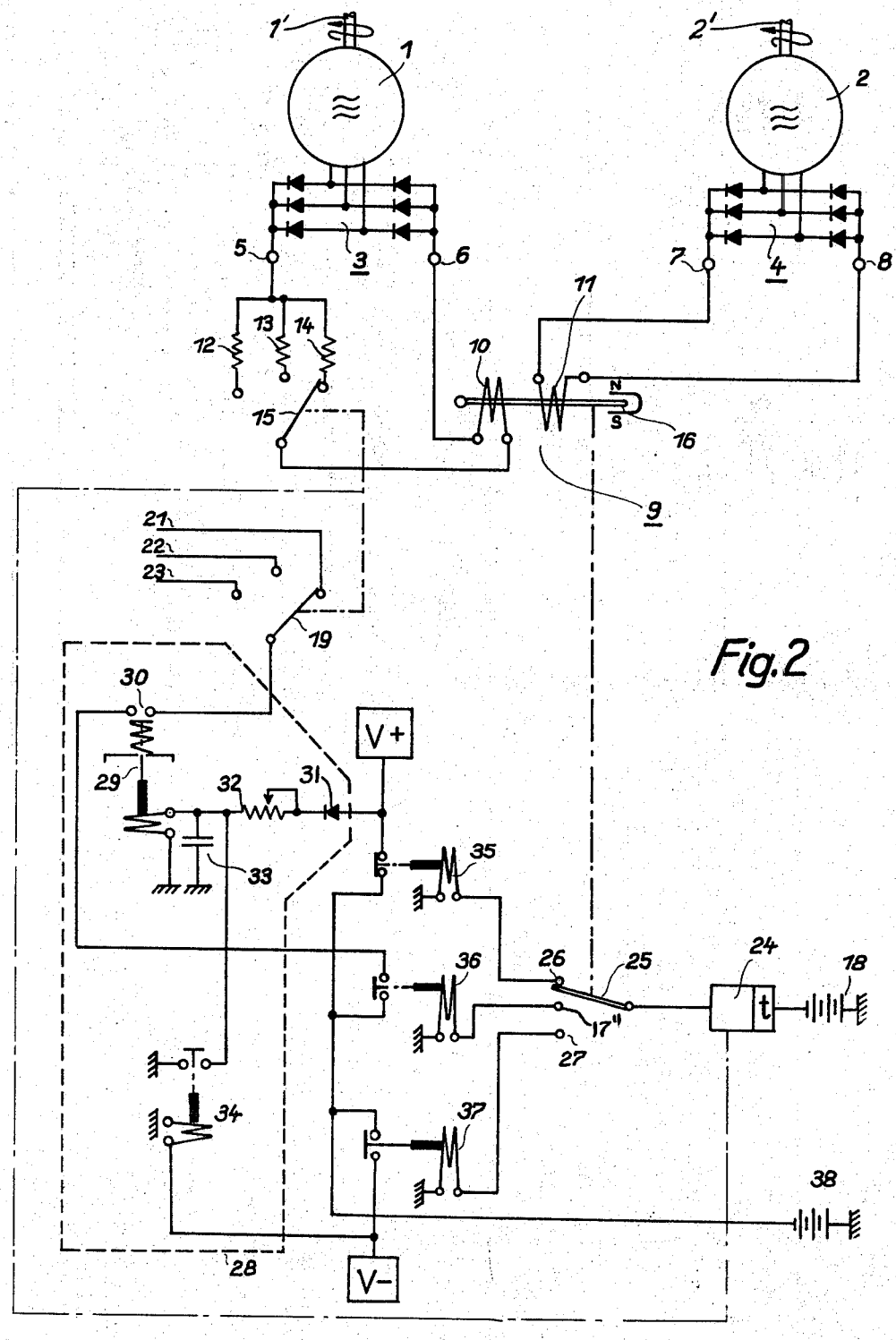
FIG. 2 shows a modified embodiment of the invention as a variation of FIG. 1.

The embodiment of the invention represented in FIG. 2 differs from the switching arrangement according to FIG. 1 in that the excitation of the circuits causing the acceleration and deceleration of the engine, as well as the excitation of the gear shift motor, are not effected directly from the current source 18 but over auxiliary relays 35, 36, and 37 from an additional energy source 38. The exciting winding of relay 29 of the blocking circuit 28 is connected in this embodiment to the current supply of the circuit V+, but in the same manner the excitation of relay 29 can also be effected from contact 26. The same holds true for the exciting winding of relay 34 for closing the holding circuit 33 of relay 29. The method of operation of the circuit shown in FIG. 2 of the drawings is as follows:

It is assumed that the driver has prepared a shiting operation from a higher to a lower gear by corresponding adjustment of the selector switch 15. This had the consequence that the previously active gear is disengaged by a suitable device and that at the same time relay 24 is excited for a certain period so that the voltage of the energy source 18 is applied to contact 25 of polarized relay 9. The engine speed being lower after such disengagement of the previously active gear than necessary for achieving synchronism of the gear members to be coupled, relay armature 16 comes into a position by reason of greater excitation of one of the control windings 10 or 11 in which it shifts contactor 25 into a position in which auxiliary relay 35 is excited from energy source 18 via contact 26 and, thus, such contact is overbridged so that circuit V+ is excited via the closed contact of auxiliary relay 35 from the energy source 38. At the same time relay 29 is excited and, thus, the electric connection between its contact 30 is interrupted. Circuit V+ is effecting an acceleration of the engine as long until synchronism of the gear members to be coupled is achieved and until an equal excitation of the control windings 10 and 11 is obtained and, thus, contactor 25 is switched over from contact 26 to contact 27. By this operation, contact 17" engaged by contactor 25 connects for a very short period energy source 18 with auxiliary relay 36 so that the latter does close contacts for such very short period when at the moment of synchronism circuit V+ starts to become inoperative and circuit V— becomes operative and such auxiliary relay 36 interrupts its contacts again immediately.

Control winding of relay 29 being still excited after de-energization of the circuit V+ by the effect of the holding circuit 33, its contacts 30 remain interrupted and no voltage can be applied from energy source via selector switch 19 to any of the signal leads 21, 22, or 23 and from there to the respective gear shifting motor means.

If the gear members to be coupled have passed through synchronism, what occurs rather quickly when the engine is accelerated, contactor 25 is closed with contact 27. Consequently, auxiliary relay 36 is de-energized and auxiliary relay 37 is energized and the latter auxiliary relay 37 closes its contacts so that circuit V— is excited from energy source 38, thus resulting in a brakeage of the engine. At the same moment also relay 34 is excited which closes its contact and short-circuits relay 29 so that now relay 29 is de-energized and closes its contacts 30. However, no voltage signal still can arrive at the selector switch 19 and from there at any of the signal leads 21, 22, or 23 since auxiliary relay 36 has been de-energized again in the meantime.

Only if the engine speed has been lowered by servo motor means V— so far that there will occur another synchronism between the gear members to be coupled, there is again a contact between contact 25 and contact 17" so that auxiliary relay 36 is again excited by energy source 18 and closes its contacts and a voltage signal is now emitted from energy source 38 over the contact of relay 36 and over the contact 30 of relay 29 also being closed now and can pass to that one of such three signal leads 21, 22 or 23 which corresponds to the gear speed having been preselected and thus will initiate operation of the respective gear shift motor means.

FIG. 3 shows a switching arrangement where the signal indicating the synchronism is not tapped by a central contact of the polarized differential relay, which is briefly closed in the synchronism of the gear members to be coupled, but the voltage signal indicating the synchronism of the gear members to be coupled appears in this embodiment of the invention on the rest contact 39 of a relay 40 which is excited in the sense of an opening of the contacts 39 as long as the gear members to be coupled do not run in synchronism. This is achieved by a reversing switch contactor 41 actuated by the armature 16 of the polarized differential relay, which is connected through relay 24 to the current source 18, with its two contacts 26a and 27a to the exciting winding of relay 40. In addition, the contacts 26a and 27a of the reversing switch are connected respectively with the circuit V+ causing the acceleration of the engine and with the circuit V— causing the deceleration of the engine, and finally diodes 26b and 27b are provided in the manner represented in FIG. 3 in the feed lines leading from the contacts 26a and 27a to the above-mentioned relay winding, which ensure a separate actuation of the circuits causing the acceleration and deceleration of the engine. The blocking circuit 42, represented in FIG. 3 inside the field bordered by broken lines, differs from the blocking circuit according to FIG. 1 in that it does not prevent the transmission of the signal indicating the synchronism of the gear members to be coupled, but prevents the formation of the signal indicating the synchronism of the gear members to be coupled at these times. This is effected in the blocking circuit 42 by a relay 43 energized from contacts 26a, which has a holding circuit indicated at 44 and a pair of contacts 45 connected in a line 46 bridging over the reversing switch 41. Another diodes 26c in FIG. 3 ensures that the excitation of the circuit V+ is not effected over line 46 but always from contacts 26a. In the path of the line 46 is also connected a pair of contacts 47 of a relay 48 which closes the pair of contacts 47 in the unexcited state. The energization of relay 48 is effected by the contact 27a of the reversing switch 41.

The method of operation of the circuit according to FIG. 3 will be described briefly below, making the same assumptions as above in the description of the method of operation of the circuit according to FIG. 1.

If the previously active higher gear is disengaged after preselection of a lower gear, the circuit through contact 26a is closed to energy source 18 by actuating the revering switch 41 by means of the relay armature 16, due to the generally too low engine speed for achieving the synchronism of the gear members to be coupled, and the acceleration of the engine is started by circuit V—. At the same time, the relay 40 is energized so that the contacts 39 are opened and no voltage is applied on the distributor switch 19. When the circuit V+ has finally led to the synchronism of the gear members to be coupled, at which time the contact 26a is disconnected from the current source 18, the energization of the relay 40 is maintained over the line 46, the contacts 47 of relay 48, as well as over the contacts 45 of relay 43, which in turn is further energized by the holding circuit 44. The holding current flowing to relay 40 over line 46 is interrupted, when the reversing switch 41 is switched to contacts 27a, since the relay 48 is energized at this moment and the contacts 47 are opened.

But even now the contacts 39 remain open, since the holding current can now flow directly from contact 27a to the exciting winding of relay 40.

Only when the synchronisms of the gear members to be coupled is established again by braking the engine, due to the action of circuit V', the contact 27a is disconnected from the current source 18, will the holding current of relay 40 be definitely interrupted and the voltage of the current source 18 be applied to the distributor switch 19 and from there to one of the signal lines 21, 22, or 23.

The circuit according to FIG. 4 differs from the embodiment of FIG. 3 in that the excitation of the circuits causing the acceleration of the engine and of the circuits causing the deceleration of the engine is effected by means of auxiliary relays 48 and 49. The blocking circuit of the arrangement according to FIG. 4 is designed substantially exactly like the blocking circuit 42 according to FIG. 3, but the interruption of 46 is effected here during the excitation of the circuit causing the deceleration of the engine not by a relay 48, but by an additional contact 50 of relay 49. The control winding of relay 43 can either be connected to the lead coming from contact 26a as shown in FIG. 4 and in an analogous manner as shown in FIG. 3, or it can be connected to the lead going to servo motor means V+ in a manner (not shown) but being analogous to the connection of the control winding of relay 29 as shown in FIG. 2.

The method of operation of the circuit shown in FIG. 4 is somewhat analogous to that of the circuit shown in FIG. 3 and operates as follows:

Assuming that the driver has switched the selector switch from a position corresponding with a higher speed to a position corresponding with a lower speed and that thereby such higher speed gear has been disengaged, the engine has again a too low speed for achieving synchronism between the gear members to be coupled. Therefore, contact 26a is connected to the energy source 18 by the contactor 41 actuated by relay armature 16 and, thus, relay 48 effects acceleration of the engine by circuit V+. At the same time, relay 40 is excited and contacts 39 of the relay are opened and consequently, no voltage signal can pass to switch 19. Also, relay 43 is excited and, thus, its contacts 45 are closed. If the excitation of circuits V+ has initiated synchronism between the gear members to be coupled and, thus, contact 26a is separated from energy source 18, further excitation of relay 40 is retained via connection lead 46, contact 50 of relay 49 and via contact 45 of relay 43, and the latter relay is further on excited by holding circuit 44. The current flow holding relay 40 through lead 46 is only cut off if the contactor of reverse switch 41 engages contact 27a and in this very moment relay 49 is excited and thus, its contacts 50 are broken.

However, there is no closing of contacts 39 yet since the holding circuit for the control winding of relay 40 can now flow immediately from contact 27a to this control winding.

Only if synchronism is again obtained by brakeage of the engine effected by circuit V— and if contact 27a is again separated from energy source 18, the holding circuit of relay 40 is definitely broken and the voltage delivered from energy source 18 can now pass through contacts 39 of relay 40 being closed now to selector switch 19 and from there to the respective one of signal leads 21, 22, or 23.

What is claimed is:

1. In a vehicle driven by an engine with a fuel supply regulator and a brake means for respectively accelerating and decelerating the engine and having a drive shaft forming the input shaft to a gear box with gear members and gear shifting means for changing the gear ratio drive to a driven shaft, means for controlling the gear shifting means to establish disengaged position of said gear members, and having electric control means for synchronized gear shifting, said control means having first A.C. generator means for generating a first voltage representing the speed of said drive shaft, second A.C. generator means for generating a second voltage representing the speed of said driven shaft, first and second rectifier means for rectifying the respective output voltage of said first and second A.C. generator means, differential relay means having two control windings connected to said first and second rectifier means respectively and having a first pair of contacts being closed during equal energization of said control windings, a plurality of interconnectable resistors selectably connected between one of said first and second rectifier means and one of said control windings of said differential relay means, each of said resistors having a characteristic resistance corresponding to a particular transmission ratio between gear members of said gear box to be coupled, equal energization of said control windings of said differential relay means taking place whenever synchronism of the gear members selected to be coupled is established, means for activating said gear shifting means and being energized via said first pair of contacts for engaging the respective selected gear members and said electric control means comprising first servo motor means for actuation of the engine brake, second servo motor means for actuation of the fuel supply regulator for said engine, means for selectively energizing said first and second servo motor means, a second pair of contacts being operated by said differential relay means and being closed whenever the speed of said drive shaft of said gear box is too high with regard to synchronism, a third pair of contacts being operated by said differential relay means and being closed whenever the speed of said drive shaft of said gear box is too low with regard to synchronism, a power source being connected to said first and second servo motor means via said second and third pairs of contacts respectively, and blocking means connected operatively between said first pair of contacts of said differential relay means and said means for activating said gear shifting means, said blocking means comprising a relay with a normally closed pair of contacts connected in series with said first pair of contacts of said differential relay means, said relay being connected to energize the output side of said third pair of contacts of said differential relay means and having a holding circuit, said holding circuit being adapted to be switched inoperative via said second pair of contacts of said differential relay means.

2. Electric control means in accordance with claim 1, in which said first servo motor means, on the one hand, and said second servo motor means and said relay comprising said holding circuit, on the other hand, are respectively connected to said power source via corresponding pairs of contacts of respective auxiliary relays, the auxiliary relay related to said first servo motor means being energizable via said second pair of contacts of said differential relay means and the auxiliary relay related to said second servo motor means being energizable via said third pair of contacts of said differential relay means.

3. Electric control means in accordance with claim 1, in which an auxiliary relay is provided for switching said holding circuit inoperative, said auxiliary relay being energzed via said second pair of contacts of said differential relay means.

4. In a vehicle driven by an engine with a fuel supply regulator and a brake means for respectively accelerating and decelerating the engine and having a drive shaft forming the input shaft to a gear box with gear members and gear shifting means for changing the gear ratio drive to a driven shaft, means for controlling the gear shifting means to establish disengaged position of said gear members and having electric control means for synchronized gear shifting, said control means having means for generating a first electrical quantity representing the speed of said drive shaft, means for generating a second electrical quantity representing the speed of said driven shaft, differential relay means for comparing said first and second electrical quantities derived from said generating means, a plurality of interconnectable circuit elements selectably connected between one of said generating means and said differential relay means, each of said circuit elements having an electrical characteristic of a magnitude corresponding to a particular transmission ratio between gear members of said gear box to be coupled and said differential relay means of said electric control means comprising a two-position switch, a signal relay being connected for energization to both output contacts of said two-position switch and having a pair of contacts which are closed in de-energized condition of said signal relay, means for activating said gear shifting means under the condition that said pair of contacts of said signal relay is in closed position, a power source connected to said activating means via said pair of contacts for energization of said gear shifting means, first servo motor means connected to one of said output contacts of said two-position switch for energization and serving for actuation of the engine brake, second servo motor means connected to the other one of said output contacts of said two-position switch for energization and serving for actuation of the fuel supply regulator for said engine whereby a deceleration of said said drive shaft takes place in the one position of the two-position switch corresponding to an excess speed condition of said drive shaft with regard to synchronism sensed by said differential relay means and an acceleration of said drive shaft takes place in the respective other position of the two-position switch corresponding to a too low speed condition of said drive shaft with regard to synchronism sensed by said differential relay means, holding relay means with predetermined holding time having an energization input connected to that one output contact of said two-position switch which is also connected to said second servo motor means and having a pair of contacts being connected to said signal relay for energization thereof, on the one hand, and to a current source, on the other hand, interrupting relay means having a normally closed pair of contacts connected in series between said current source and said pair of contacts of said holding relay means and having an energization input connected to that one output contact of said two-position switch which is also connected to said first servo motor means, and oriented electric valves for effectively electrically separating said signal relay and said first and second servo motor means from each other.

5. Electric control means in accordance with claim 4, in which an auxiliary relay is arranged between said second servo motor means and the corresponding one of said output contacts of said two-position switch, said interrupting relay means having an additional, normally opened pair of contacts, said contacts being connected between said first servo motor means and the respective other one of said output contacts of said two-position switch.

6. In a vehicle driven by an engine with a fuel supply regulator and a brake means for respectively accelerating and decelerating the engine and having a drive shaft forming the input shaft to a gear box with gear members and gear shifting means for changing the gear ratio drive to a driven shaft, means for controlling the gear shifting means to establish disengaged position of the gear members and having electric control means for synchronized gear shifting, said electric control means having means for generating a first electrical quantity representing the speed of said drive shaft, means for generating a second electrical quantity representing the speed of said driven shaft, means for comparing said first and second electrical quantities derived from said generating means, a plurality of selectably interconnectable circuit elements connected between one of said generating means and said comparing means, each of said circuit elements having an electrical characteristic of a magnitude corresponding to a particular transmission ratio between gear members of said gear box to be coupled, said comparing means providing a signal whenever synchronism of the gear members selected to be coupled is established, means for activating said gear shifting means in response to said signal for engaging the respective selected gear members, and said electric control means comprising first servo motor means for actuation of the engine brake, second servo motor means for actuation of the fuel supply regulator for said engine, means for energizing said first and said second servo motor means, two-condition switch means for selectively controlling energization of said first and said second servo motor means dependent on the speed relation between the selected gear members to be coupled and blocking means connected operatively between said comparing means and said means for activating said gear shifting means, said blocking means preventing said signal of said comparing means from being delivered to said gear shifting means for a predetermined time during the switch-over operation of said two-condition switch means from the condition in which said second servo motor means is energized to the condition in which said first servo motor means is energized but allowing said signal to be delivered during a switch-over operation of said two-condition switch means from a condition in which said first servo motor means is energized to a condition in which said second servo motor mean is energized.

References Cited
UNITED STATES PATENTS

| | | | |
|---|---|---|---|
| 3,052,134 | 9/1962 | Worster | 74—866 |
| 3,077,121 | 2/1963 | Schaub | 74—861 |
| 3,103,826 | 9/1963 | Jaeschke | 74—339 |
| 3,417,640 | 12/1968 | Schmidt, et. al. | 74—339X |
| 3,433,101 | 3/1969 | Scholl et al. | 74—866 |

WILLIAM L. FREEH, Primary Examiner

U.S. Cl. X.R.

74—339, 872